(12) United States Patent
Shimizu et al.

(10) Patent No.: US 10,133,253 B2
(45) Date of Patent: Nov. 20, 2018

(54) OPERATION LIMITING DEVICE FOR MACHINE TOOL

(71) Applicant: JTEKT CORPORATION, Osaka-shi (JP)

(72) Inventors: Akihiro Shimizu, Kariya (JP); Hiroaki Sugiura, Toyota (JP); Toshihiro Yonezu, Nishio (JP)

(73) Assignee: JTEKT CORPORATION, Osaka-shi (JP)

( * ) Notice: Subject to any disclaimer, the term of this patent is extended or adjusted under 35 U.S.C. 154(b) by 227 days.

(21) Appl. No.: 14/428,723

(22) PCT Filed: Oct. 31, 2013

(86) PCT No.: PCT/JP2013/079523
§ 371 (c)(1),
(2) Date: Mar. 17, 2015

(87) PCT Pub. No.: WO2014/069560
PCT Pub. Date: May 8, 2014

(65) Prior Publication Data
US 2015/0248124 A1  Sep. 3, 2015

(30) Foreign Application Priority Data

Oct. 31, 2012  (JP) .................. 2012-239797

(51) Int. Cl.
*G05B 19/19* (2006.01)
*G05B 19/4061* (2006.01)

(52) U.S. Cl.
CPC ......... *G05B 19/19* (2013.01); *G05B 19/4061* (2013.01); *G05B 2219/49144* (2013.01); *Y02P 90/265* (2015.11)

(58) Field of Classification Search
CPC ............... G05B 19/19; G05B 19/4061; G05B 2219/49144; Y02P 90/265
See application file for complete search history.

(56) References Cited

U.S. PATENT DOCUMENTS

| 4,608,643 A | 8/1986 | Breitenstein et al. |
| 4,999,784 A * | 3/1991 | Kawamura .......... G05B 19/195 700/159 |

(Continued)

FOREIGN PATENT DOCUMENTS

| JP | 56 024608 | 3/1981 |
| JP | 60 160407 | 8/1985 |

(Continued)

OTHER PUBLICATIONS

Machine translation of JPH07-96481, Method for setting Robot operating range and its control device, Apr. 11, 1995, 2 pages.*

(Continued)

*Primary Examiner* — Thomas C Lee
*Assistant Examiner* — Tri T Nguyen
(74) *Attorney, Agent, or Firm* — Oblon, McClelland, Maier & Neustadt, L.L.P.

(57) ABSTRACT

An operation limiting device applicable to a wide variety of machine tools and which improves the freedom of setting an operation limiting area. Two or three drive axes (Xa, Za) in different directions are designated from among a plurality of drive axes in the machine tool and the designated drive axes (Xa, Za) form the two or three dimensional coordinate system. An area (Ar) for limiting the operation of the mobile body is set in the two or three dimensional coordinate system. A drive axis (Xa) which is in operation is determined, and in the two or three coordinate system including (Continued)

the drive axis which is in operation the operation of the mobile body is limited when the mobile body enters into the limiting area (Ar).

11 Claims, 6 Drawing Sheets

(56) References Cited

U.S. PATENT DOCUMENTS

| | | | | |
|---|---|---|---|---|
| 6,269,283 | B1 * | 7/2001 | Shinozaki | G05B 19/4061 700/172 |
| 2008/0018287 | A1 * | 1/2008 | Ogawa | G05B 19/4061 318/652 |
| 2010/0269327 | A1 * | 10/2010 | Gray | B23Q 39/027 29/592 |
| 2013/0006394 | A1 | 1/2013 | Iuchi et al. | |

FOREIGN PATENT DOCUMENTS

| | | |
|---|---|---|
| JP | 4 71202 | 11/1992 |
| JP | 08 152908 | 6/1996 |
| JP | 2006 102923 | 4/2006 |
| JP | 2008 15740 | 1/2008 |
| JP | 2008 234295 | 10/2008 |
| WO | 2011 117915 | 9/2011 |

OTHER PUBLICATIONS

Extended European Search Report dated Jun. 2, 2016 in Patent Application No. 13850867.6.

International Preliminary Report on Patentability dated Apr. 30, 2015 in PCT/JP2013/079523 (English translation only).

International Search Report dated Nov. 26, 2013 in PCT/JP13/079523 filed Oct. 31, 2013.

* cited by examiner

OPERATION LIMITING DEVICE FOR MACHINE TOOL

TECHNICAL FIELD

The present invention relates to an operation limiting device for a machine tool.

BACKGROUND ART

In the machine tool, in order to prevent the tool from interfering with other parts, the operation of the tool may be limited. For example, JP Patent Publication No. 60-160407 and JP Patent Publication No. 2008-234295 disclose that the limit (minimum and maximum values) in a moving axis direction is set and when the tool movement exceeds the limit value in manual machining operation, the manual operation is stopped.

Further, according to JP H4-71202 B2, by setting a workpiece interference region corresponding to the position of the outer surface of the workpiece, whether or not a tool is entered into the workpiece interference region is detected.

SUMMARY OF INVENTION

Technical Problem(s)

However, in order to have a wide variety of functions, a machine tool having a number of drive axes has been proposed. For example, there exists a drive axis used exclusively for truing a tool in addition to a drive axis used for moving the tool. Therefore, depending on the type of the mobile body and the type of the drive axis by which the mobile body is driven, condition of the interference state is different. Further, when the mobile body is operated by a plurality of drive axes, even the maximum and minimum values of operation limiting area relative to one of the plurality of the drive axes can be set, such limiting area is not considered to be appropriately set.

The present invention has been made in consideration with the above issues and the object of the invention is to provide an operation limiting device for a machine tool which is applicable to a wide variety of machine tools and yet which improves the degree of freedom in setting the operation limiting region therefor.

Solution to Problem(s)

The present disclosure is characterized in that the operation limiting device for a machine tool includes a drive axis designating means for designating two or three drive axes in different directions among a plurality of drive axes, a coordinate system forming means for forming a two-dimensional coordinate system or a three-dimensional coordinate system by the two or three drive axes designated by the drive axis designating means, a limiting area setting means for setting a limiting area to limit an operation of a mobile body which moves by the two or three drive axes designated by the drive axis designating means in the two-dimensional coordinate system or the three-dimensional coordinate system, the limiting area corresponding to the two or three drive axes designated by the drive axis designating means, a determining means for determining a drive axis by which the mobile body is in operation and a limiting means for limiting the operation of the mobile body when the mobile body enters into the limiting area, using the limiting area set in the two-dimensional coordinate system or the three-dimensional coordinate system formed by the drive axis by which the mobile body is in operation.

According to this structure of the invention, two or three drive axes in different directions among a plurality of drive axes are designated and an area where the operation of the mobile body is limited in the two-dimensional coordinate system or the three-dimensional coordinate system including the designated drive axis. Accordingly, the degree of freedom of setting the operation limiting area can be highly improved. Further, the operation limiting area can be set according to the drive axes even for the machine tool having various types of the drive axes and accordingly, the operation limiting area can be surely and appropriately set.

Preferably, the determining means determines the drive axis by which the mobile body is in operation in a manual operation mode and the limiting means limits the operation of the mobile body, using the limiting area set in the two-dimensional system or the three-dimensional coordinate system formed by the drive axis by which the mobile body is in operation in the manual operation mode.

Further, preferably, the determining means determines the drive axis by which the mobile body is in operation in an automated operation mode and the limiting means limits the operation of the mobile body using the limiting area set in the two-dimensional coordinate system or the three-dimensional coordinate system formed by the drive axis by which the mobile body is in operation in the automated operation mode.

The applicable operation mode is either the manual operation mode or the automated operation mode. At the manual operation mode, a worker operates the machine tool and accordingly, the worker is naturally stays in the vicinity of the machine tool for operation thereof and at the automated operation mode, the worker operates the machine tool staying in the vicinity of the machine tool for confirmation of the operation. Accordingly, the worker can operate by observing the operation of the machine tool at the above operation mode. Thus, by applying the above modes, an interference caused by a careless mistake (mistakes such as, in data setting, in handle magnification selection or in override setting) can be avoided.

Preferably, the limiting means changes a handle magnification to a limited magnification at a handle operation mode of the manual operation mode. Further, preferably, the limiting means changes an inching speed to a limited speed at an inching motion operation mode of the manual operation mode.

Further, preferably, the limiting means changes a designated speed to a limited speed.

Still further, preferably, the limiting means slows down a speed of the mobile body without stopping thereof when the mobile body enters into the limiting area. As one method of limiting the operation, the mobile body is not stopped but the speed thereof is slowed down. Accordingly, the operation limiting area can be set with a relatively large clearance distance. In other words, it is not necessary to severely set the operation limiting area at a borderline position of whether or not to interfere and therefore setting can be easily made. Further, if the mobile body should enter into the operation limiting area by a setting error or the like, the speed of the mobile body is slowed down and accordingly a worker can recognize such speed change of the mobile body to let the worker recognize the possibility of existing of setting error.

Particularly, during the manual operation mode, sometimes it may be desired to have the mobile body operate until to a position close to an object or have the mobile body to be in contact with the object. Under such situation it is preferable to have the mobile body to be in operable state. However, a heavy collision between the object and the mobile body should be avoided. Such request can be responded by adapting this method.

Particularly, during the automated operation mode, when the mobile body enters into the operation limiting area, the speed of the mobile body is limited and therefore, a worker can determine whether the program data is incorrect or not and if determined to be incorrect, the machine operation can be stopped. On the other hand, if determined that the program data is correct and that the mobile body is operated properly within the operation limiting area, the worker can surely observe the limited operation of the mobile body.

In this case, it is preferable that the limiting means slows down the speed of the mobile body without stopping thereof when a target position of the mobile body is in the limiting area. Further, it is preferable that the limiting means slows down the speed of the mobile body without stopping thereof when a current position of the mobile body is in the limiting area. It is preferable that the machine tool includes a plurality of drive axes in a same direction, the coordinate system forming means forms a two-dimensional coordinate system or a three-dimensional coordinate system for each of the plurality of drive axes in the same direction, the limiting area setting means sets the limiting areas respectively corresponding to the plurality of drive axes in the same direction. It is preferable that the limiting area is formed of a rectangular shape or a rectangular parallelepiped shape and the limiting area setting means sets the limiting area by designating vertices of the rectangular shape or the rectangular parallelepiped shape in the two-dimensional coordinate system or the three-dimensional coordinate system.

EMBODIMENTS FOR IMPLEMENTING INVENTION

<Structure of Grinding Machine>
As an example of a grinding machine according to the embodiment a grinding head traverse type grinding machine will be explained. However, it is noted that the invention is not limited to the grinding head traverse type grinding machine, but any other type grinding machine can be applicable and any machine tool other than the grinding machine can be applicable.

Figure 1:
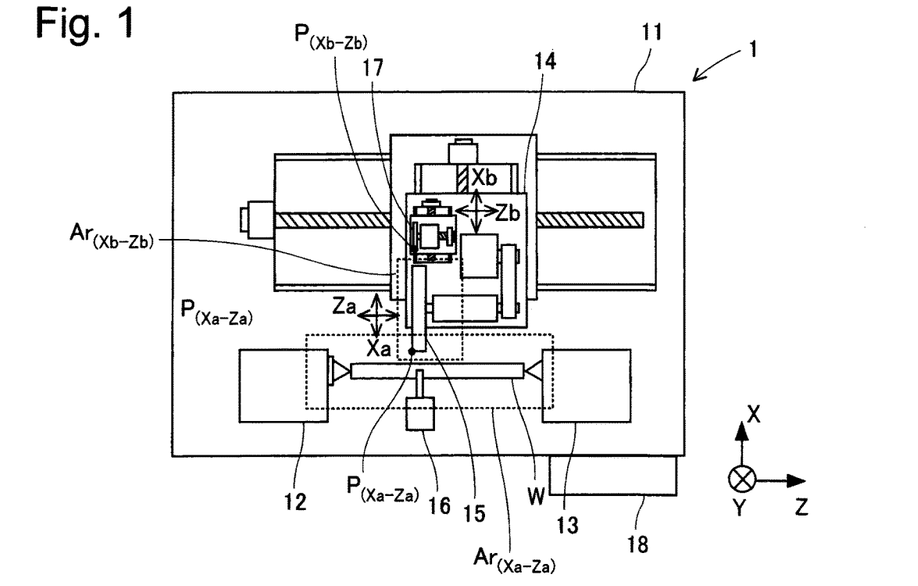
FIG. 1 is a plain view of a grinding machine according to an embodiment of the invention.

The grinding tool according to the embodiment will be explained with reference to FIG. 1. As shown in FIG. 1, the grinding machine 1 includes a bed 11 fixed on a floor and a main spindle 12 and a tailstock device 13 which rotatably support a workpiece W fixed to the bed 11 at both sides. Further, the grinding machine 1 includes a grinding head 14 movable on the bed 11 in a Z-axis (Za) direction and an X-axis (Xa) direction, a grinding wheel 15 rotatably supported by the grinding head 14 and a sizing device 16 which measures a diameter of the workpiece W.

Still further, the grinding machine 1 includes a truing device 17 which is movable on the grinding head 14 in a Z-axis (Zb) direction and an X-axis (b) direction. The truing device 17 is used for forming the grinding wheel 15. Further, the grinding machine 1 is provided with a control device 18 which controls rotation of the main spindle 12 and the grinding wheel 15 and at the same time, controls position of the grinding wheel 15 relative to the workpiece W and further controls the truing device 17. It is noted that the operation limiting device according to the invention corresponds to the control device 18.

(Explanation of Operation Limiting Area)
In the grinding machine 1, as indicated by the broken line in FIG. 1, the operation limiting areas $Ar_{(Xa\text{-}Za)}$ and $Ar_{(Xb\text{-}Zb)}$ are set. Detailed operation limiting areas $Ar_{(Xa\text{-}Za)}$ and $Ar_{(Xb\text{-}Zb)}$ will be explained with reference to FIGS. 2 and 3.

The first operation limiting area $Ar_{(Xa\text{-}Za)}$ defines the interference between the grinding wheel 15 and the workpiece W. In other words, as shown in FIG. 1, the first operation limiting area $Ar_{(Xa\text{-}Za)}$ indicates a limiting area of a grinding point $P_{(Xa\text{-}Za)}$ of the grinding wheel 15 relative to the workpiece W.

The grinding wheel 15 is operated by the drive axis in the Xa direction and the drive axis in the Za direction. Accordingly, the first operation limiting area $Ar_{(Xa\text{-}Za)}$ is formed to be a rectangular shaped area in the two-dimensional coordinate system formed by the Xa direction and the Za direction as shown in FIG. 1. In other words, the coordinate system of the first operation limiting area $Ar_{(Xa\text{-}Za)}$ indicates a two-dimensional coordinate system formed by the direction of movement of the grinding wheel 15 relative to the workpiece W defined as a reference.

Figure 2:
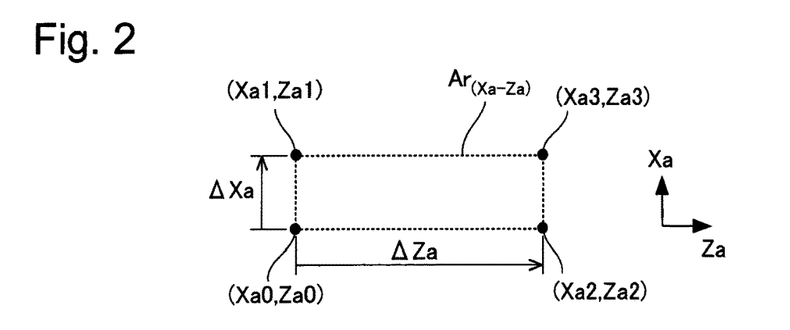
FIG. 2 is a detail explanation view of a first operation limiting area in FIG. 1.

As shown in FIG. 2, the first operation limiting area $Ar_{(Xa\text{-}Za)}$ is enclosed by a reference point (Xa0, Za0), a first vertex (Xa1, Za1) which is separated from the reference point (Xa0, Za0) by ΔXa in an Xa direction, a second vertex (Xa2, Za2) which is separated from the reference point (Xa0, Za0) by ΔZa in Za direction and a third vertex (Xa3, Za3) which is separated from the second vertex (Xa2, Za2) by ΔXa in the Xa direction to form a rectangular shape thereby.

The second operation limiting area $Ar_{(Xb\text{-}Zb)}$ defines the interference between the tooling device 17 and the grinding wheel 15. In other words, as shown in FIG. 1, the second operation limiting area $Ar_{(Xb\text{-}Zb)}$ indicates a limiting area of an end point $P_{(Xb\text{-}Zb)}$ of the truing device 17 relative to the grinding wheel 15.

The truing device 17 is operated by the drive axis in the Xb direction and the drive axis in the Zb direction. Accordingly, the second operation limiting area $Ar_{(Xb\text{-}Zb)}$ is formed to be a rectangular shape area in the two-dimensional coordinate system formed by the Xb direction and the Zb direction as shown in FIG. 1. In other words, the coordinate system of the second operation limiting area $Ar_{(Xb\text{-}Zb)}$ indicates a two-dimensional coordinate system formed by the direction of movement of the truing device 17 relative to the grinding wheel 15 defined as a reference.

Figure 3:
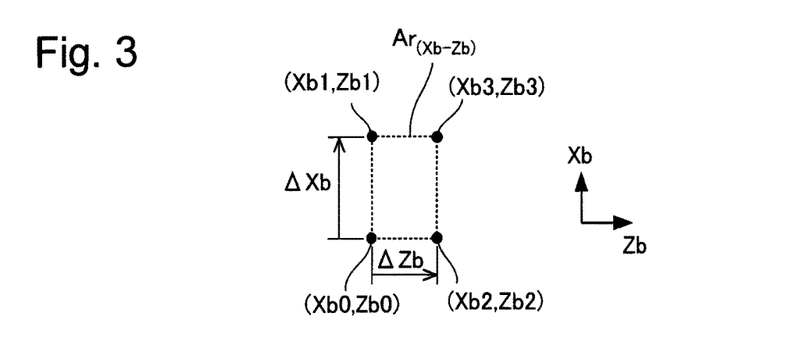
FIG. 3 is a detail explanation view of a second operation limiting area in FIG. 1.

As shown in FIG. 3, the second operation limiting area Ar$_{(Xb-Zb)}$ is enclosed by a reference point (Xb0, Zb0), a first vertex (Xb1, Zb1) which is separated from the reference point (Xa0, Za0) by ΔXb in an Xb direction, a second vertex (Xb2, Zb2) which is separated from the reference point (Xb0, Zb0) by ΔZb in Zb direction and a third vertex (Xb3, Zb3) which is separated from the second vertex (Xb2, Zb2) by ΔXb in the Xb direction to form a rectangular shape thereby.

(Block Diagram of Control Device)

Figure 4:
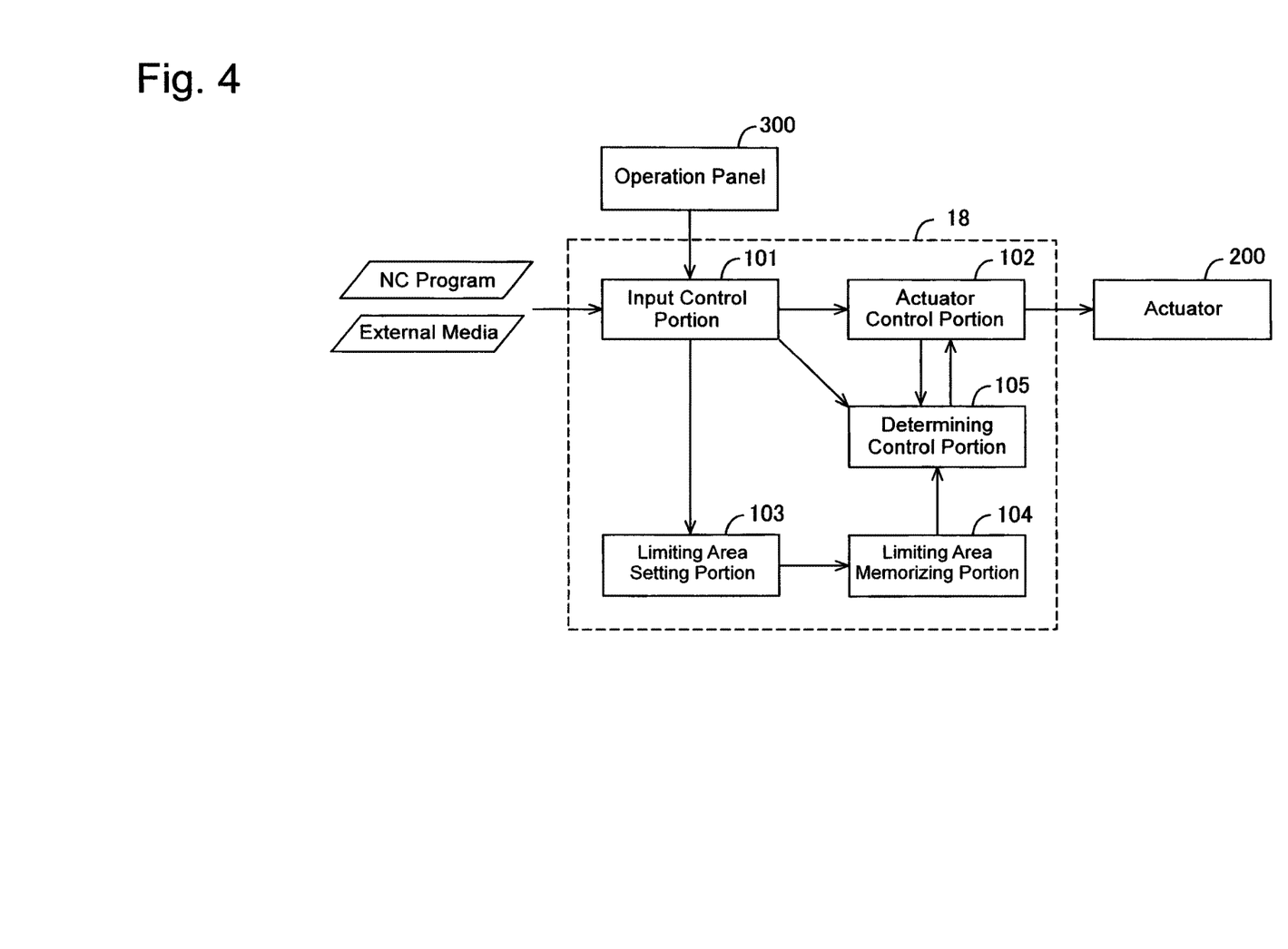
FIG. 4 is a block diagram of a control device in FIG. 1.

Next, the functional block diagram for the control device 18 will be explained with reference to FIG. 4. As shown in FIG. 4, the control device 18 includes an input control portion 101, an actuator control portion 102, a limiting area setting portion 103, a limiting area memorizing portion 104 and a determining control portion 105.

The input control portion 101 inputs an NC program by operation of a worker, obtains information memorized in an external media and obtains operation of the worker on an operation panel 300.

The actuator control portion 102 controls an actuator 200 such as motor based on the NC program inputted by the input control portion 101. For example, when the workpiece W is machined by the grinding wheel 15, the actuator control portion 102 controls the grinding head 14 to move in the Xa direction and the Za direction upon the instructions of the NC program. In this case, the actuator control portion 102 controls the motor which operates the grinding head 14.

Further, when the grinding wheel 15 is formed by operating the truing device 17, the actuator control portion 102 controls the truing device 17 to move in the Xb direction and the Zb direction upon the instructions of the NC program. In this case, the actuator control portion 102 controls the motor which operates the truing device 17. Further, when the operation is limited by the determining control portion 105, the actuator control portion 102 controls the speed of the mobile body to be slowed down.

The limiting area setting portion 103 sets the first and the second operation limiting areas Ar$_{(Xa-Za)}$ and Ar$_{(Xb-Zb)}$ shown in FIGS. 1 through 3. The limiting area setting portion 103 sets the first and the second operation limiting areas Ar$_{(Xa-Za)}$ and Ar$_{(Xb-Zb)}$ based on the information relating to the limiting area inputted by the input control portion 101. The detail of the limiting area setting portion 103 will be explained later.

The limiting area memorizing portion 104 memorizes the first and the second operation limiting areas Ar$_{(Xa-Za)}$ and Ar$_{(Xb-Zb)}$ which are set by the limiting area setting portion 103. It is noted however, that the first and the second operation limiting areas Ar$_{(Xa-Za)}$ and Ar$_{(Xb-Zb)}$ which are memorized in the limiting area memorizing portion 104 are the coordinate systems set as indicated in FIGS. 2 and 3 and the coordinate of the vertices of the coordinate systems.

The determining control portion 105 determines whether an operation should be limited or not when an operation limiting invalidation signal is OFF at the manual operation mode or the automated operation mode. When the determining control portion 105 determines that the operation should be limited, the determining control portion 105 controls the actuator control portion 102 to slow down the speed of the mobile body. The operation limiting invalidation signal is obtained by the input control portion 101. The detail of the determining control portion 105 will be explained later.

(Operation Limiting Area Setting Processing)

Figure 5:
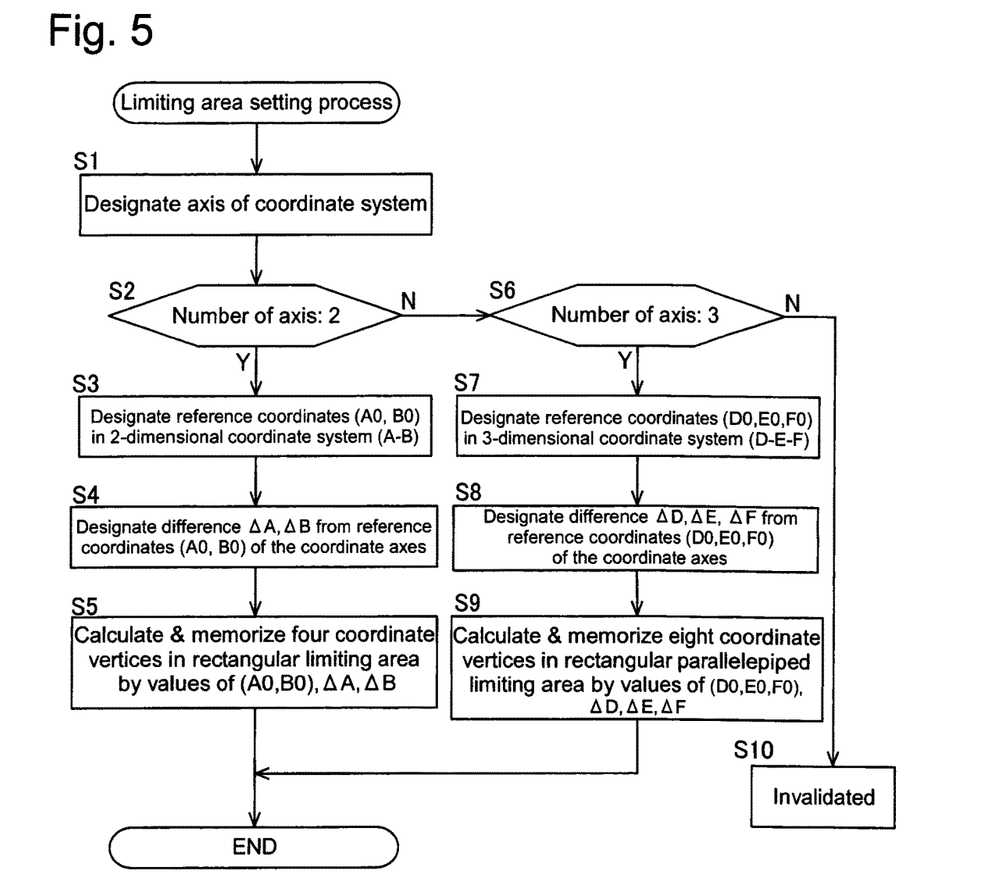
FIG. 5 is a flowchart showing a process of a limiting area setting processing portion of FIG. 4.

The processing for setting the operation limiting area by the limiting area setting portion 103 will be explained with reference to FIG. 5. As shown in FIG. 5, the limiting area setting portion 103 designates the axes of the coordinate system for the operation limiting area (step S1) (corresponding to the drive axis designating means according to the invention). For example, when the first operation limiting area Ar$_{(Xa-Za)}$ as shown in FIG. 1 and FIG. 2 is set, the two axes, the axis Xa and the axis Za are designated. The drive axes to be designated are inputted by a worker from the operation panel 300 in advance or may be inputted using the drive axes memorized in the external media. Further, such drive axes can be described in the NC program.

Then, whether the number of the designated axes is "two (2)" or not is determined (at the step S2). If the number thereof is determined not to be "two", whether the number of the designated axis is three (3)" or not is determined (S6). If not the "three" (S6: N), the setting process is invalidated and the process ends (S10). It is noted however, that at the step S6, if the number of designated axis is not "three", the program may return to the step S1 to again designate the number of the axes at the step S1.

At the step S2, when the number of designated axes is determined to be the "two" (S2: Y), the two-dimensional coordinate system (A-B) is formed and the reference coordinate (A0, B0) in the two-dimensional coordinate system (A-B) is designated (S3) (corresponding to the coordinate system forming means according to the invention). The coordinate system in FIG. 2 is indicated as the two-dimensional coordinate system (Xa-Za) and the reference coordinate thereof is (Xa0, Za0). Inputting of the reference coordinates (A0, B0) can be made by either one of NC program, external media and the operation panel 300.

Next, the differences ΔA, ΔB from the reference coordinate (A0, B0) are designated (S4). In FIG. 2, the difference in the Xa axis direction is designated as ΔXa and the difference in the Za axis direction is ΔZa. Inputting of the differences ΔA, ΔB may be made similarly as explained above. Further, when the workpiece W is changed, the reference coordinates (A0, B0) and the differences ΔA, ΔB may be designated by activating the NC program in order to facilitate the inputting work by the worker.

Then, the four vertex coordinates of the rectangular operation limiting area Ar are calculated based on the reference coordinate (A0, B0) and the differences ΔA, ΔB and are memorized in the limiting area memorizing portion 104 (S5) (corresponding to the limiting area setting means according to the invention). In FIG. 2, the four vertexes of the operation limiting area Ar$_{(Xa-Za)}$ are designated as four coordinates (Xa0, Za0), (Xa1, Za1), (Xa2, Za2) and (Xa3, Za3).

Figure 8:
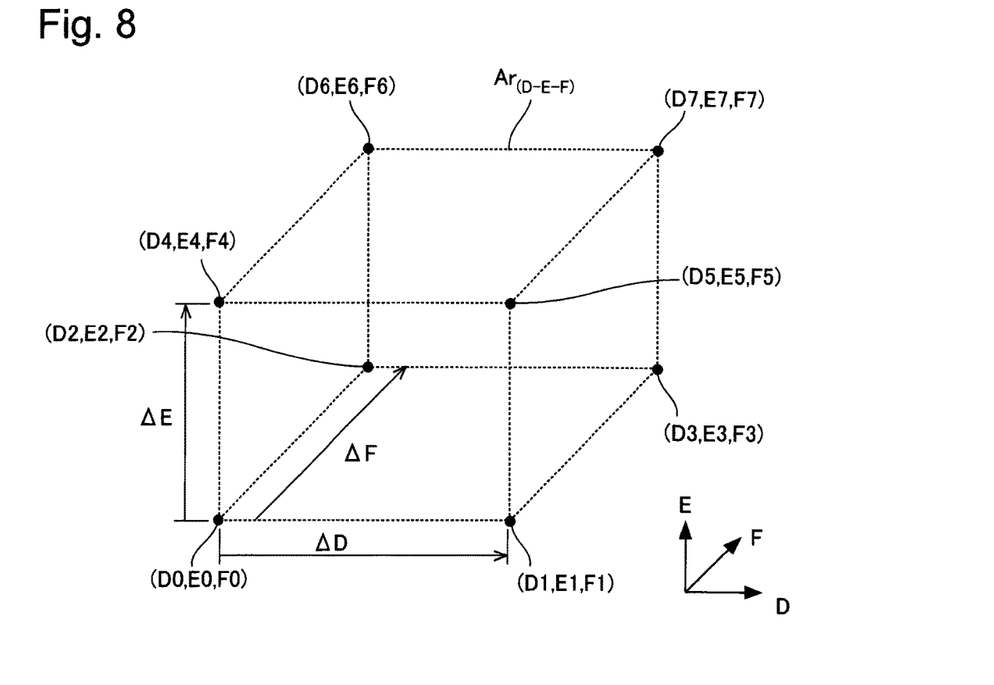
FIG. 8 is a view indicating an operation limiting area of a three-dimensional coordinate system at the steps S7 through S9 in FIG. 5.

On the other hand, at the step S6, when the number of the designated axes is judged to be "three" (S6: Y), the three-dimensional coordinate system (D-E-F) is formed and the reference coordinate (D0, E0, F0) in the three-dimensional coordinate system (D-E-F) is designated (S7) (corresponding to the coordinate system forming means according to the invention). This will be explained, for example, with reference to FIG. 8. Next, the differences ΔD, ΔE, ΔF from the reference coordinate (D0, E0, F0) in the coordinate axes are designated (S8). In FIG. 8, the difference in the D-axis direction is designated as ΔD, the difference in the E-axis direction is ΔE and the difference in the F-axis direction is ΔF.

Then, the eight vertex coordinates of the rectangular parallelepiped operation limiting area Ar are calculated based on the reference coordinates (D0, E0, F0) and the differences ΔD, ΔE ΔF and are memorized in the limiting area memorizing portion 104 (S9) (corresponding to the limiting area setting means according to the invention). In FIG. 8, the vertexes of the operation limiting area $Ar_{(D-E-F)}$ are designated as eight coordinates (D0, E0, F0), (D1, E1, F1), (D2, E2, F2), (D3, E3, F3), (D4, E4, F4), (D5, E5, F5), (D6, E6, F6), and (D7, E7, F7).

Thus, two or three drive axes in different directions among the plurality of the drive axes are designated and the area in which the operation of the mobile body is limited in the two-dimensional coordinate system or the three-dimensional coordinate system including the designated drive axes are set. Accordingly, the freedom of design for setting the operation limiting area can be highly improved. Further, as explained above, even in a machine tool which includes a wide variety of drive axes including such as Xb axis and Zb axis which move the truing device 17 other than the axes such as Xa axis and Za axis which move the grinding head 14, an operation limiting area according to the type of drive axes can be set to achieve a sure and proper setting of the operation limiting area.

(Operation Limiting Determining and Operation Limiting Control Processing)

Figure 6:
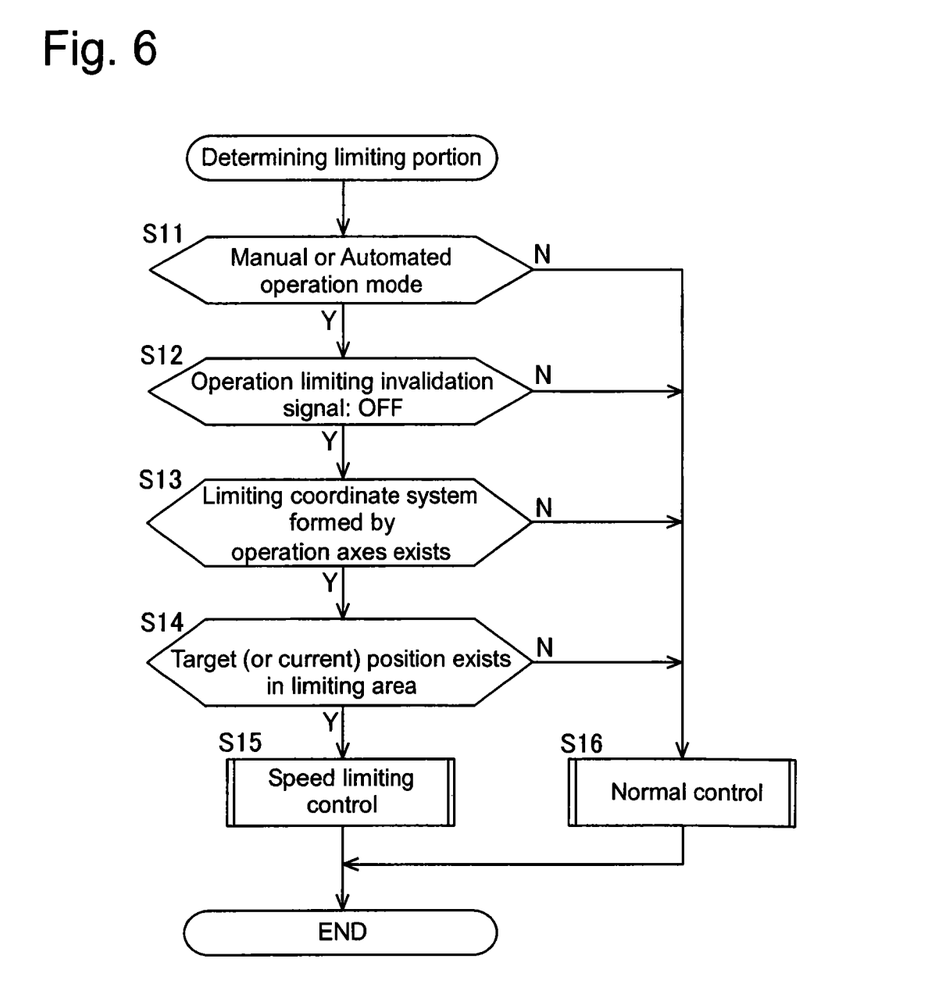
FIG. 6 is a flowchart of a process of a determining limiting portion in FIG. 4.

Next, the operation limiting determining and the operation limiting control processing by the operation limiting control portion 105 in FIG. 4 will be explained with reference to FIGS. 6 and 7. The operation limiting control portion 105 determines whether the operation mode is in manual operation mode or in automated operation mode (S11) (Corresponding to the determining means according to the invention).

The manual operation mode includes a handle operation mode and the inching operation mode. The handle operation mode means the mode in which a handle provided at the operation panel 300 is, for example, rotated to move the designated mobile body in the designated axial direction. In this handle operation mode, setting of the magnification of the handle operation can be possible and accordingly, the mobile body can be moved with a speed corresponding to the set value of the magnified ratio of the handle operation.

The inching operation mode means the mode in which an inching button which is provided at the operation panel 300 is pushed down to move the designated mobile body in the designated axial direction. The worker can set an overriding of the inching speed by operating the operation panel 300.

Next, at the step S11, whether the operation limiting invalidation signal is OFF or not is determined (S12) when the mode is under the manual operation mode or the automated operation mode (S11: Y). At the initial setting of the operation limiting invalidation signal is set to be OFF where the operation limiting is to be performed. An ON/OFF switching-over control of the operation limiting invalidation signal can be freely made by a worker using the operation panel 300 (See FIG. 4).

Next, at the step S12, when the operation limiting invalidation signal is determined to be OFF (S12: Y), whether a coordinate system formed by drive axis which is going to operate to move the mobile body towards the target position or the drive axis which is currently operating (these axes are called hereinafter as an "operating axis") exists among the coordinate systems memorized in the limiting area memorizing portion 104 or not is determined (S13). (Corresponding to the determining means according to the invention). For example, when the operating axis corresponds to the Xa axis, a two-dimensional coordinate system (Xa-Za) exists.

Next, at the step S13, an appropriate coordinate system is determined to be existing (S13: Y), then whether the target position or the current position of the subject position P of the mobile body exists in the operation limiting area or not is determined (S14). For example, as shown in FIG. 1, the grinding point $P_{(Xa-Za)}$ of the grinding wheel which corresponds to the subject point P is in the operation limiting area $Ar_{(Xa-Za)}$ or not is determined.

Next, when the condition of the step S14 is satisfied, the speed limiting control is performed (S15). (Corresponding to the limiting means according to the invention). On the other hand, when the conditions of the steps S11 through S14 are not satisfied, a normal control is performed (S16). The normal control means a control that the speed limiting control at the step S15 is not operated.

It is noted here that at the step S12, when the operation limiting invalidation signal is changed to ON by the operation of a worker, the normal control is performed as explained above. When a correct normal operation is confirmed during the normal controlling, it is possible to keep the operation limiting validation signal to be ON. While the operation limiting validation signal keeps ON state, no speed limiting control is performed and normal control is performed.

The speed limiting control will be explained hereinafter, with reference to FIG. 7. The mode for performing the speed limiting control from the step S11 in FIG. 6 is in the handle operation mode, the inching operation mode or the automated operation mode.

Figure 7:
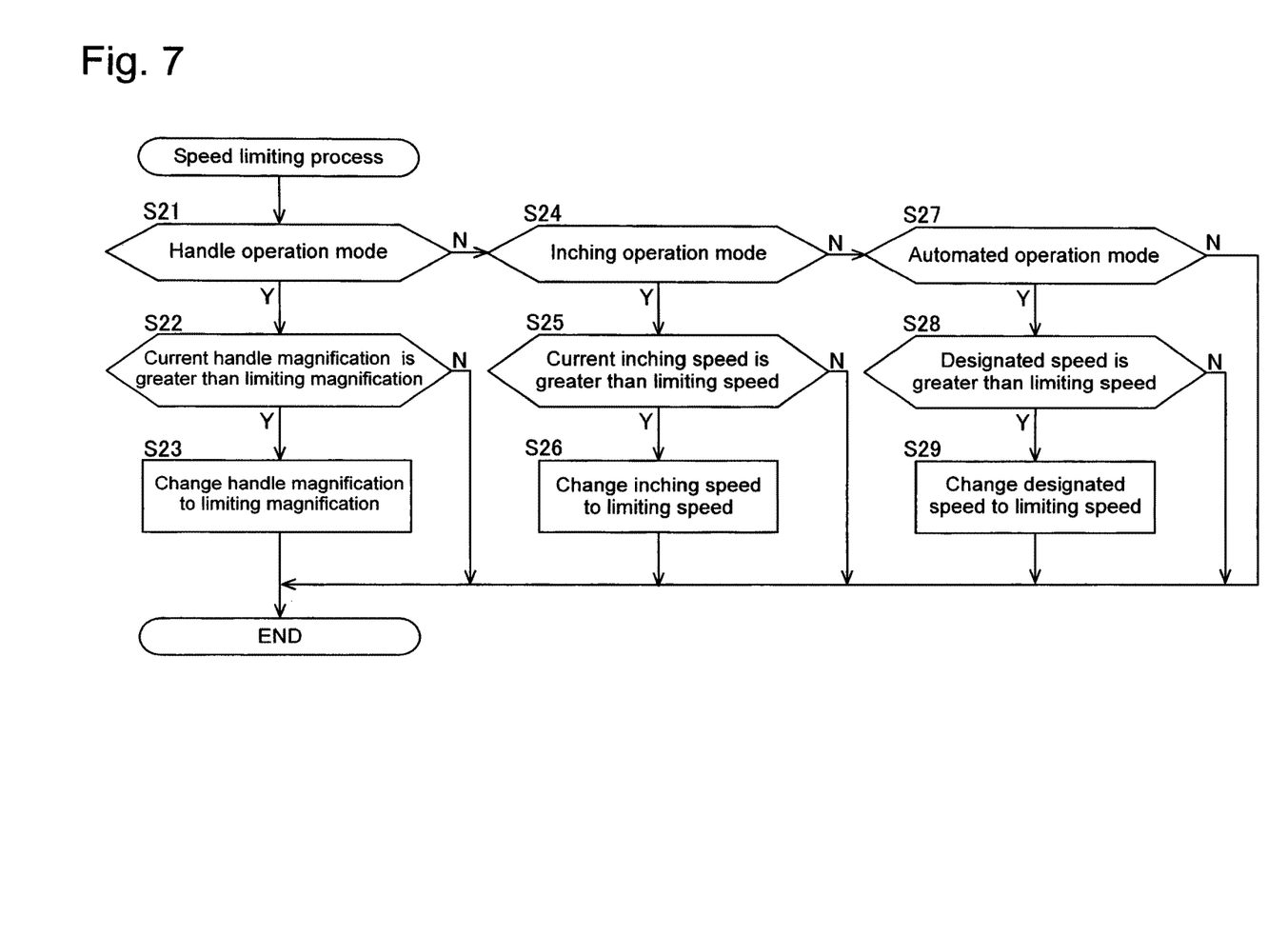
FIG. 7 is a flowchart of a speed limiting process in FIG. 6.

As shown in FIG. 7, when the mode is the handle operation mode (S21: Y), whether the current handle magnification is greater than a predetermined limiting magnification or not is determined. (S22). If determination is satisfied (Yes), the handle magnification is changed to the limiting magnification. In other words, thereafter, the mobile body is operated under the limiting magnification set lower than the handle magnification. It is noted that the limiting magnification is set to be a value lower than the magnification normally set, but not including zero.

When the mode is in the inching operation mode (S21: N, S24: Y), whether the currently set inching speed is greater than a predetermined limiting speed or not is determined (S25). If determination is satisfied (Yes), the inching speed is changed to the limiting speed. In other words, thereafter, the mobile body is operated under the limiting speed set lower than the inching speed. It is noted that the limiting speed is set to be a value lower than normally set, but not including zero.

When the mode is in the automated operation mode (S24: N, S27: Y), whether the target speed or a current designated speed is greater than a predetermined limiting speed or not is determined (S28). If judgment is satisfied (Yes), the designated speed is changed to the limiting speed. In other words, thereafter, the mobile body is operated under the limiting speed set lower than the designated speed. It is noted that the limiting speed is set to be a value lower than normally set, but not including zero.

As explained above, the mode for operation limiting is applied in the manual operation mode or the automated operation mode. In the manual operation mode, the operation is performed by a worker and therefore, the worker naturally stays in the vicinity of the machine tool. At the automated operation mode, the operation is performed under the worker staying in the vicinity of the machine tool, confirming the operation. Thus, by applying the operation limiting to the above modes, an interference caused by a careless mistake (mistakes such as, in data setting, in handle magnification selection or in override setting) can be avoided.

As one method of limiting the operation, the mobile body is not stopped but the speed thereof is slowed down.

Accordingly, the operation limiting area Ar can be set with a relatively a large clearance distance. In other words, it is not necessary to set the operation limiting area Ar at a borderline position of whether or not for the mobile body to interfere with the object and therefore setting can be easily made. Further, if the mobile body should enter into the operation limiting area by a setting error or the like, the speed of the mobile body is slowed down and accordingly a worker can recognize such speed change of the mobile body to let the worker know the possibility of existing of setting error Further, particularly, during the manual operation mode, sometimes it may be desired to have the mobile body operate until to a position close to an object or have the mobile body to be in contact with the object. Under such situation it is preferable to have the mobile body to be in operable state. However, a heavy collision between the object and the mobile body should be avoided. Such request can be responded by adapting this method according to the embodiment.

Particularly, during the automated operation mode, when the mobile body enters into the operation limiting area, the speed of the mobile body is limited and therefore, a worker can determine whether the program data is wrong or not and if the worker judges that the program data is incorrect, the machine operation can be stopped, for example, by an emergency button being pushed by the worker while the speed of the mobile body is decreased. On the other hand, if determined that the program data is correct and that the mobile body is operated properly within the operation limiting area, the worker can surely observe the limited operation of the mobile body. It is noted that the emergency stopping operation of the machine is performed separately from the processing of the operation limiting determining and the operation limiting control processing.

According to the embodiment, as one of the operation limiting methods, the speed of the mobile body is slowed down not to stop the movement of the mobile body. However, the method is not limited to this embodiment but can be stopping the mobile body. Such stopping of the mobile body would not obtain the effects which are obtained by not stopping the mobile body.

The invention claimed is:

1. An operation limiting device for a machine tool comprising:
   input control means;
   a drive axis designating means for manually designating two or three first drive axes and two or three second drive axes among a plurality of drive axes of the machine tool using the input control means;
   a coordinate system forming means for forming a first two-dimensional coordinate system or a first three-dimensional coordinate system by the two or three first drive axes designated by the drive axis designating means, and for forming a second two-dimensional coordinate system or a second three-dimensional coordinate system by the two or three second drive axes designated by the two or three second drive axes designated by the drive axis designating means, wherein at least one of the two second drive axes extends in a direction that is different from either of the two first drive axes;
   a limiting area setting means for setting a first limiting area based on information relating to the first limiting area manually input by the input control means to limit an operation of a first mobile body which moves according to the two or three first drive axes designated by the drive axis designating means in the first two-dimensional coordinate system or the first three-dimensional coordinate system, the first limiting area corresponding to the two or three first drive axes designated by the drive axis designating means, the limiting area setting means for setting a second limiting area based on information relating to the second limiting area manually input by the input control means to limit an operation of a second mobile body which moves according to the two or three second drive axes designated by the drive axis designating means in the second two dimensional coordinate system or the second three-dimensional coordinate system, the second limiting area corresponding to the two or three second drive axes designated by the drive axis designating means;
   a determining means for determining two or three third drive axes by which the first mobile body or the second mobile body is in operation and determining whether a third two-coordinate system or a third three-coordinate system formed by the third drive axes is one of (a1) the first two-dimensional coordinate system or the first three-dimensional coordinate system and (a2) the second two dimensional coordinate system or the second three-dimensional coordinate system; and
   a limiting means for limiting the operation of the first mobile body or the second mobile body when the respective mobile body enters into the third limiting area,
   wherein:
   the first coordinate system has a same components as the first drive axes;
   the second coordinate system has a same components as the second drive axes;
   the two or three first drive axes move the first mobile body with respect to a bed of the machine tool;
   the two or three second drive axes move the second mobile body with respect to the first mobile body;
   the first limiting area limits an operation of the first mobile body which moves according to the two or three first drive axes; and
   the second limiting area limits an operation of the second mobile body which moves according to the two or three second drive axes.

2. The operation limiting device for a machine tool according to claim 1, wherein the determining means determines the drive axis by which the mobile body is in operation in a manual operation mode and the limiting means limits the operation of the mobile body using the limiting area set in the two-dimensional coordinate system or the three-dimensional coordinate system formed by the drive axis by which the mobile body is in operation in the manual operation mode.

3. The operation limiting device for a machine tool according to claim 2, wherein the limiting means changes a handle magnification to a limited magnification at a handle operation mode in the manual operation mode.

4. The operation limiting device for a machine tool according to claim 2, wherein the limiting means changes an inching speed to a limited speed at an inching motion operation mode in the manual operation mode.

5. The operation limiting device for a machine tool according to claim 1, wherein the determining means determines the drive axis by which the mobile body is in operation in an automated operation mode and the limiting means limits the operation of the mobile body using the limiting area set in the two-dimensional coordinate system or the three-dimensional coordinate system formed by the drive axis by which the mobile body is in operation in the automated operation mode.

6. The operation limiting device for a machine tool according to claim 5, wherein the limiting means changes a designated speed to a limited speed.

7. The operation limiting device for a machine tool according to claim 2, wherein the limiting means slows down a speed of the mobile body without stopping thereof when the mobile body enters into the limiting area.

8. The operation limiting device for a machine tool according to claim 7, wherein the limiting means slows down the speed of the mobile body without stopping thereof when a target position of the mobile body is in the limiting area.

9. The operation limiting device for a machine tool according to claim 7, the limiting means slows down the speed of the mobile body without stopping thereof when a current position of the mobile body is in the limiting area.

10. The operation limiting device for a machine tool according to claim 1, wherein the machine tool includes a plurality of drive axes in a same direction, the coordinate system forming means forms a two-dimensional coordinate system or a three-dimensional coordinate system for each of the plurality of drive axes in the same direction, and wherein the limiting area setting means sets the limiting areas respectively corresponding to the plurality of drive axes in the same direction.

11. The operation limiting device for a machine tool according to claim 1, the plurality of limiting areas are each formed of a rectangular shape or a rectangular parallelepiped shape and the limiting area setting means sets the limiting areas by designating vertices of the rectangular shape or the rectangular parallelepiped shape in the two-dimensional coordinate system or the three-dimensional coordinate system.

* * * * *